United States Patent [19]

Winget

[11] Patent Number: 5,062,661
[45] Date of Patent: Nov. 5, 1991

[54] AUTOMOTIVE AIR BAG COVER HAVING A HORN SWITCH FORMED THEREIN

[76] Inventor: Larry J. Winget, 1799 Foxknoll, Leonard, Mich. 48038

[21] Appl. No.: 555,893

[22] Filed: Jul. 20, 1990

[51] Int. Cl.$^5$ ............................................. B60R 21/08
[52] U.S. Cl. ..................................... 280/731; 280/743
[58] Field of Search ......................... 280/731, 743, 728

[56] References Cited

U.S. PATENT DOCUMENTS 4,325,568  4/1982  Clark et al. ........................... 280/731
4,934,735  6/1990  Embach ................................ 280/731

Primary Examiner—Kenneth R. Rice
Attorney, Agent, or Firm—Brooks & Kushman

[57] ABSTRACT

An automotive air bag cover including a horn switch device incorporated therein, is provided. The air bag cover includes substantially rigid front and side panels which are adapted to enclose an uninflated automotive air bag. The front panel has inner and outer surfaces and is connected to the side panels at seams to permit the inflating air bag to leave the cover as the inflating air bag exerts a force at the inner surface of the front panel sufficient to cause the front panel to separate from the side panels along the seams. The horn switch device includes a flexible, manually operable diaphragm at the outer surface of the front panel. The diaphragm has a first electrically conductive inner surface for making a circuit with a corresponding second electrically conductive inner surface of the front panel upon manual actuation of the diaphragm.

5 Claims, 1 Drawing Sheet

AUTOMOTIVE AIR BAG COVER HAVING A HORN SWITCH FORMED THEREIN

TECHNICAL FIELD

This invention relates to air bag covers and, in particular, to air bag covers having a horn switch incorporated therein.

BACKGROUND ART

Presently, when air bags are provided in automotive vehicles the air bag is stored in the steering column of the vehicle behind an air bag cover. During automatic inflation of the air bag, the air bag cover moves away from the steering column to permit the air bag to perform its safety function between the steering column and the operator of the vehicle.

Any manually operable horn switch or switches are typically also located on the steering wheel column on opposite sides of the air bag cover. However, these switches typically are rather small and oftentimes inaccessible for drivers who have large hands or for drivers who have limited manual dexterity.

SUMMARY OF THE INVENTION

An object of the present invention is to provide an automotive air bag cover having a horn switch device incorporated therein.

In carrying out the above objects and other objects of the present invention, an automotive air bag cover constructed in accordance with the present invention is provided. The air bag cover includes substantially rigid front and side panels adapted to enclose an uninflated automotive air bag. The front panel has inner and outer surfaces. The front panel is interconnected to the side panels at seams which permit the inflated air bag to leave the cover wherein the inflating air bag exerts a force at the inner surface of the front panel sufficient to cause the front panel to separate from the side panels along the seams. The air bag cover further includes a horn switch device, including a flexible manually-operable diaphragm at the outer surface of the front panel. The diaphragm has a first electrically conductive inner surface for making a circuit path with the corresponding second electrically conductive inner surface of the front panel upon manual actuation of the diaphragm.

Preferably, the diaphragm is integrally formed with the front panel.

Also, preferably, the second electrically conductive inner surface is defined by a rigid plate connected to remainder of the front panel.

The automatic air bag cover constructed in accordance with the above invention provides numerous advantages. For example, the horn switch device is easily accessible on the outer surface cover. Furthermore, such a switch device can be relatively inexpensively incorporated in a conventional air bag cover, thereby freeing up additional areas on the steering column.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
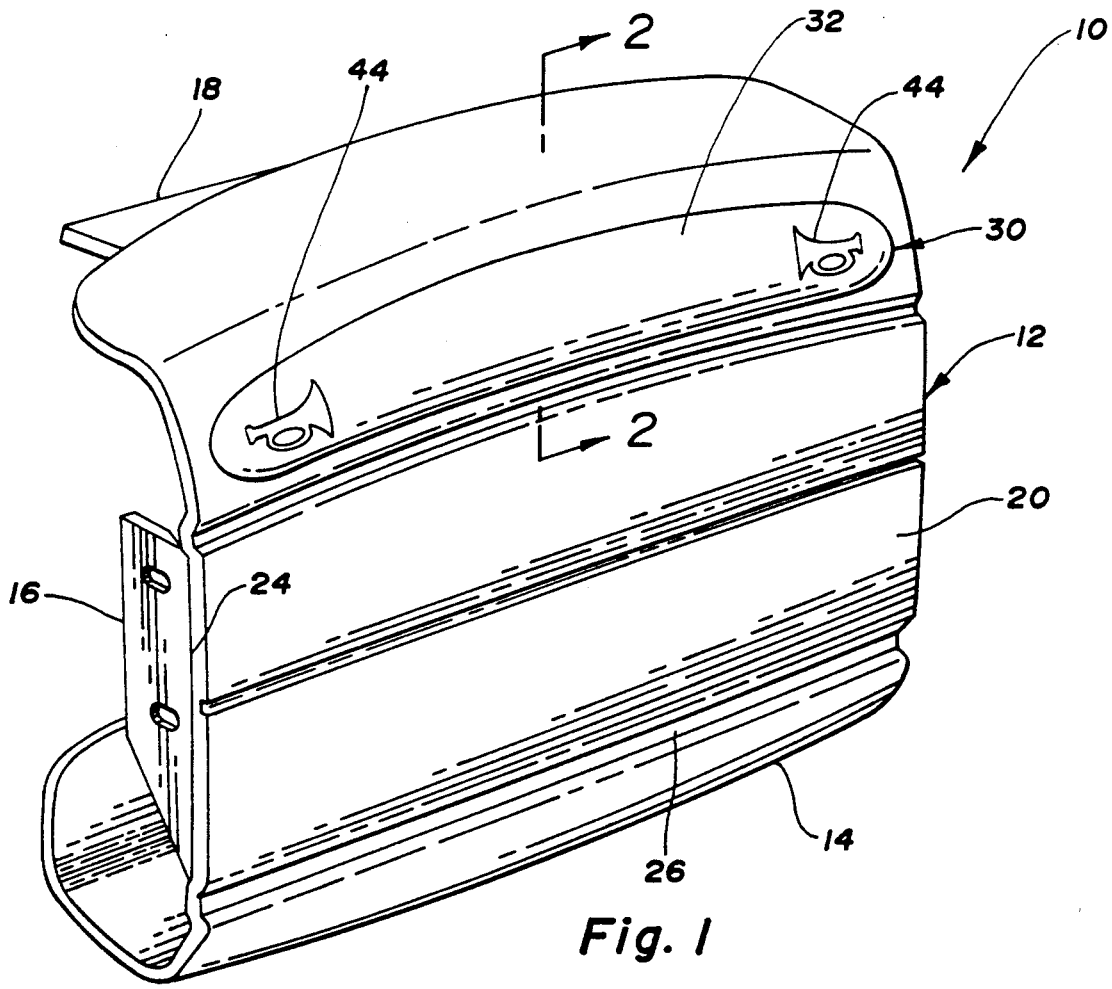
FIG. 1 illustrates an automotive air bag cover, constructed in accordance with the present invention.

Referring now to the drawing figures, there is illustrated in FIG. 1 an automotive air bag cover, generally indicated at 10, constructed in accordance with the present invention. Typically, the automotive air bag cover 10 is secured at the top end of a vehicle drive column at the steering wheel of the vehicle.

A substantially rigid front panel, generally indicated at 12 of the cover 10, is integrally formed with side panels 14, 16 and 18 (only one of the side panels 16 is shown). Typically, the side panels 14, 16 and 18 are apertured, as illustrated in FIG. 1, to permit the cover 10 to be fixedly secured to the vehicle steering column.

The front and side panels 12, 14, 16, and 18 are adapted to enclose an uninflated automotive air bag between the cover 10 and the steering column.

The front panel 12 is interconnected to the side panels 16 and 14 at seams 24 and 26, which are of reduced thickness, to permit the air bag as it is inflating, to exert a force at the inner surface 22 of the front panel 12 to cause the front panel 12 to separate from the side panels 14 and 16 along the seams 24 and 26.

Figure 2:
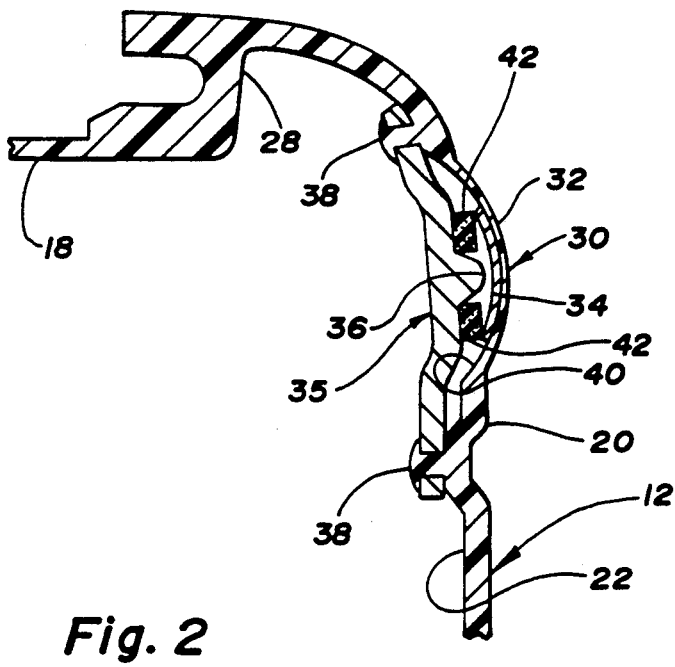
FIG. 2 is a sectional view, taken along lines 2—2 of FIG. 1, illustrating the horn switch device of the present invention.

The front panel 12 is hingedly connected to the top panel 18 at a hinge 28, as best shown in FIG. 2 so that after separation from the side panels 14 and 16, the front panel 18 can swing upwardly and out of the way of the inflating air bag.

The air bag cover 10 includes a horn switch device, generally indicated at 30, which extends substantially the entire width of the front panel 12 between the side panels 16. The horn switch device 30 includes a flexible manually operable diaphragm 32 preferably integrally formed with the rest of the front panel 12 and the side panels 14, 16 and 18 from plastic (preferably TPO). The diaphragm 32 has a convex shape at the outer surface 20 of the front panel 12.

The diaphragm 32 has at its inner surface thereof, a strip of electrically conductive aluminum tape 34 which forms a first electrically conductive inner surface for making a circuit path with a corresponding second electrically conductive inner surface 35 of a substantially rigid plate, generally indicated at 36. The plate 36 may comprise a molded switch with a molded in connector which is heat-staked or otherwise attached to the plastic portion of the front panel 12 at a plurality of locations 38. Alternately, the plate 36 may be made of an electrically conductive metal.

Alternately, the electrically conductive aluminum tape 34 may be replaced by a conductive thermoplastic with a molded-in connector, which, when the diaphragm 32 is manually actuated, electrically engages or is electrically connected to the inner surface 35 of the molded plate 36.

The plate 36, the diaphragm 32 and the electrically conductive aluminum tape 34 define a hollow compartment 40 within the front panel 30. A pair of spaced, elongated foam-insulators 42 are disposed between the plate 36 and the conductive tape 34 so that the electrical connection is only made at the top of the electrically conductive surface 37 between the insulators 42.

Referring again to FIG. 1, preferably indicia 44 are formed on the outer surface of the diaphragm 32 to indicate the function of the switch horn device 30.

The advantages accruing to an automotive air bag cover 10 constructed as described above are numerous. For example, the function provided by the switch horn device 30 can be accomplished relatively inexpensively and can provide a relatively large surface area for manual operation. Also, the air bag cover 10 with the horn switch device 30 formed therein, frees up additional space on the vehicle steering column.

While a preferred embodiment of the subject invention has been shown and described in detail, those skilled in this art will recognize various alternative designs and embodiments for practicing the present invention as defined by the following claims.

What is claimed is:

1. An automotive air bag cover comprising:

substantially rigid front cover and side panels adapted to enclose an uninflated automotive air bag, the front panel having inner and outer surfaces and being interconnected to the side panel at seams which permit the inflating air bag to leave the cover, the inflating air bag exerting a force at the inner surface of the front panel sufficient to cause the front panel to separate from the side panels along the seams; and a horn switch device including a flexible manually operable diaphragm at the outer surface of the front panel, the diaphragm having a first electrically conductive inner surface for making a circuit path with a corresponding second electrically conductive inner surface upon manual actuation of the diaphragm, the second electrically conductive inner surface being defined by a rigid plate attached to the substantially rigid remainder of the front panel to move therewith wherein the first and second electrically conductive inner surfaces define a hollow compartment in the front panel and wherein upon separation from the side panels the front panel including the diaphragm, the hollow compartment and the rigid plate move together to permit the inflating air bag to leave the cover.

2. The air bag cover as claimed in claim 1 wherein the diaphragm is integrally formed with the front panel.

3. The air bag cover as claimed in claim 1 wherein the front panel is hingedly connected to one of the side panels to allow the front panel to swing open during inflation of the air bag.

4. The air bag cover as claimed in claim 1 wherein the first electrically conductive inner surface is defined by an electrically conductive material.

5. The air bag cover as claimed in claim 1 further comprising at least one insulator disposed in the hollow compartment to insulate portions of the first and second electrically conductive inner surfaces from one another.

* * * * *